A. S. PENNINGTON & E. BEGGS,

Said PENNINGTON assignor to A. B. PENNINGTON.

SPRINKLER.

No. 10,310. Reissued Apr. 10, 1883.

*Witnesses:*
C. V. Beggs
E. V. Beggs

*Inventors.*
Aaron S. Pennington
Eugene Beggs

UNITED STATES PATENT OFFICE.

AARON S. PENNINGTON AND EUGENE BEGGS, OF PATERSON, N. J.; SAID PENNINGTON ASSIGNOR TO ANNA B. PENNINGTON, OF SAME PLACE.

SPRINKLER.

SPECIFICATION forming part of Reissued Letters Patent No. 10,310, dated April 10, 1883.

Original No. 203,069, dated April 30, 1878. Application for reissue filed January 8, 1883.

*To all whom it may concern:*

Be it known that we, AARON S. PENNINGTON and EUGENE BEGGS, of Paterson, in the county of Passaic and State of New Jersey, have invented certain new and useful Improvements in Sprinklers; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
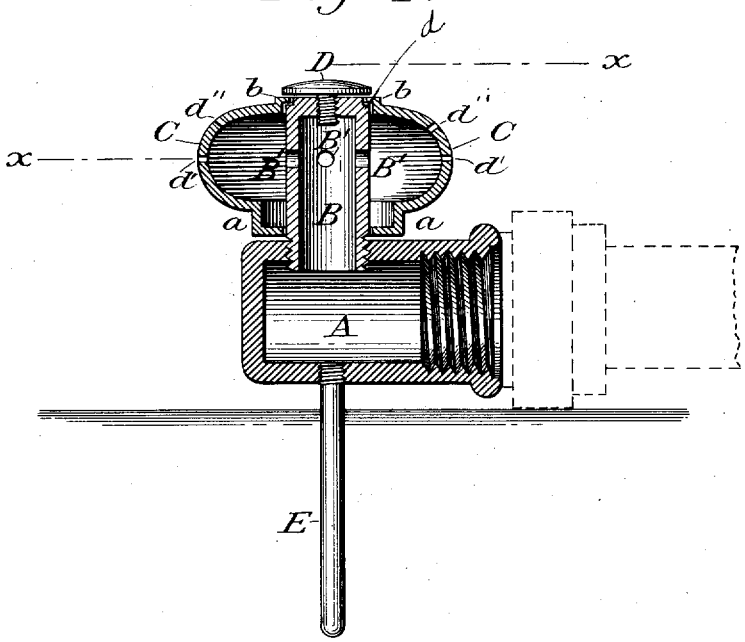
Figure 2:
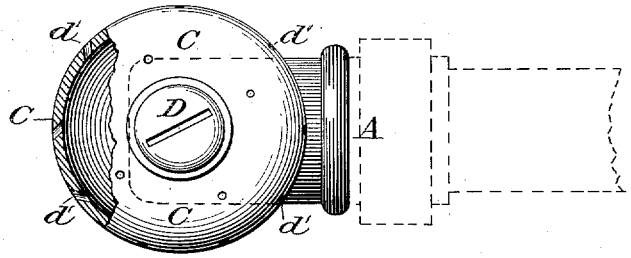

In the accompanying drawings, Figure 1 represents a vertical longitudinal section of our improved sprinkler; and Fig. 2, a top view of the same, partly in horizontal section on line *x x*, Fig. 1.

Similar letters of reference indicate corresponding parts.

This invention has reference to an improved sprinkler of cheap and compact construction for lawns, streets, &c., by which water may be thrown in a circle from three to twenty-five feet and more in diameter, according to the pressure of water let on.

In the drawings, A represents a tubular socket-tube, that is screwed to the end of the water-conducting hose. B is a vertical socket-tube, that is screwed or otherwise secured at right angles to the first socket-tube, and provided with radial water-discharge holes B′ at the side. A rose, C, of circular shape, is fitted tightly to the second tube, B, the lower part or shoulder, *a*, of the rose bearing on the tube B, while the upper part or shoulder, *b*, is supported on a tapering or other bearing, *d*, of tube B, the rose being retained thereon by a screw, D, with large head, bearing on the top of the rose. The bearings of the rose on the tube are of different diameters, for the purpose of allowing the rose to revolve easily at a high as well as at a low pressure of the water, as otherwise the rose would lock itself against the head of the retaining-screw. The rose C is provided with a number of discharge-holes, *d′*, at the outer circumference, which holes are placed in a plane passing preferably through the hole B, but bored at a certain angle of inclination through the rose, so as to produce the revolving motion of the same by the forcible discharge of the water through the holes. A smaller number of discharge-holes, *d″*, is bored through the shell of the rose, but arranged at an opposite angle of inclination and in an upward direction, for the purpose of retarding the speed of the rose for throwing the water at a greater distance, and also for throwing a second number of jets at a shorter distance from the rose, so as to distribute the water over the whole surface and give jets of different direction and form.

The sprinkler is secured to the ground by means of a bottom pin, E, of not more than a quarter of an inch in thickness, so as not to mar the ground, secured to the socket-tube A, so that the rose revolves in a horizontal position, and throws thereby the water in most effective manner, sprinkling to a greater or smaller distance, according to the pressure let on by the stop-cock.

The sprinkling device is very compact, easily repaired, and cheap on account of its simplicity and absence of expensive supports.

Having thus described our invention, we claim as new and desire to secure by Letters Patent—

1. The combination of the screw-pipe A, the laterally-perforated pipe B, and the revolving rose C, as shown and described.

2. The combination of the screw-pipe A, the laterally-perforated pipe B, the revolving rose C, and the pin E, as shown and described.

In testimony whereof we affix our signatures in presence of two witnesses.

AARON S. PENNINGTON.
EUGENE BEGGS.

Witnesses:
B. B. VAN WAGONER,
ALBERT A. WILCOX.